US005549229A

United States Patent [19]
Grabowski

[11] Patent Number: 5,549,229
[45] Date of Patent: Aug. 27, 1996

[54] LUGGAGE RACK

[75] Inventor: Norbert E. Grabowski, Rochester Hills, Mich.

[73] Assignee: Chrysler Corporation, Auburn Hills, Mich.

[21] Appl. No.: 384,491

[22] Filed: Feb. 6, 1995

[51] Int. Cl.$^6$ ...................................................... B60R 9/00
[52] U.S. Cl. .......................................... 224/321; 224/326
[58] Field of Search .................................... 224/309, 321, 224/325, 326

[56] References Cited

U.S. PATENT DOCUMENTS

| | | | |
|---|---|---|---|
| 4,047,689 | 9/1977 | Grendahl | 248/503.1 |
| 4,406,386 | 9/1983 | Rasor et al. | 224/321 |
| 4,982,886 | 1/1991 | Cucheran | 224/321 |
| 5,007,570 | 4/1991 | Himmel | 224/321 |
| 5,170,920 | 12/1992 | Corrente et al. | 224/321 |
| 5,203,483 | 4/1993 | Cucheran | 224/321 |
| 5,362,007 | 7/1994 | Pudney et al. | 224/321 |

FOREIGN PATENT DOCUMENTS 94010007  5/1994  WIPO .................................. 224/321

*Primary Examiner*—Renee S. Luebke
*Attorney, Agent, or Firm*—Edward A. Craig

[57] ABSTRACT

A luggage rack for an automotive vehicle comprising a pair of side rails adapted to be mounted on the roof of an automotive vehicle in laterally spaced apart relation. Each rail has an elongated channel extending lengthwise thereof. One or more cross members extend between the rails and have stanchions at the ends slidably engaged in the channels. A lock member is mounted in a recess in each stanchion. Each lock member has a locking pin engageable in any one of a line of apertures formed in the associated side rail. Each lock member is spring-pressed to a position in which the locking pin engages one of the apertures. Each lock member has a button accessible through an opening in the stanchion which may be pressed to withdraw the pin from an aperture and permit the cross member to be adjusted lengthwise of the rails.

6 Claims, 3 Drawing Sheets

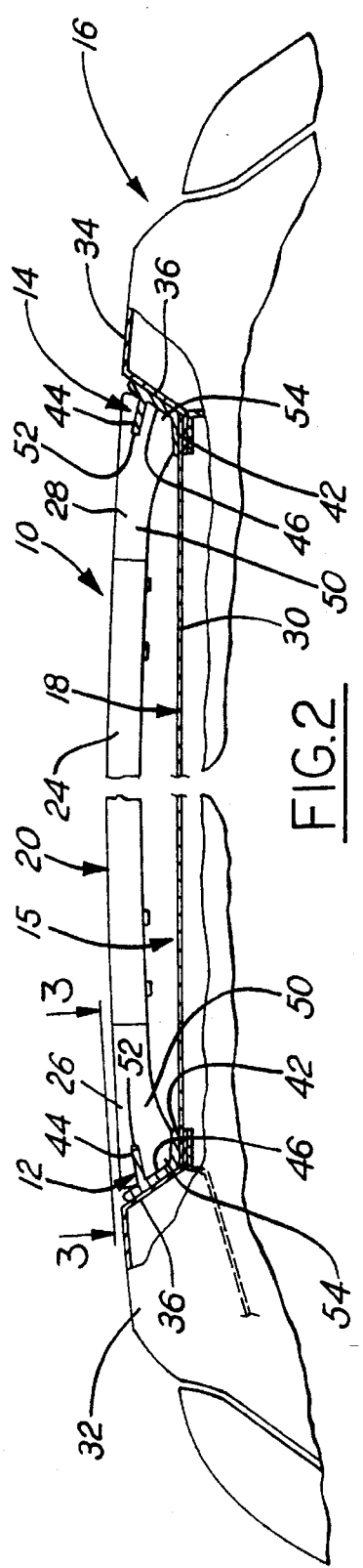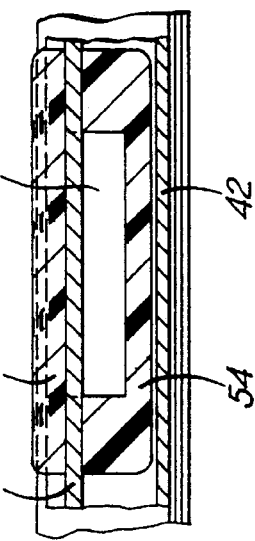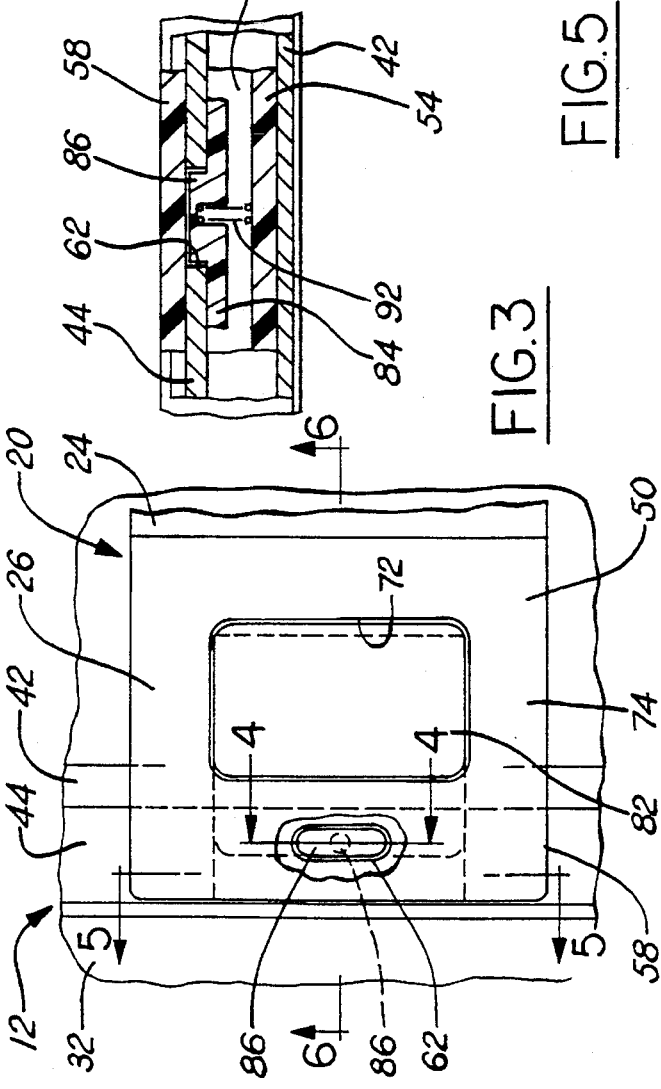

LUGGAGE RACK

FIELD OF THE INVENTION

This invention relates generally to luggage racks and more particularly to a luggage rack adapted to be mounted on an automotive vehicle.

BACKGROUND AND SUMMARY

Luggage racks are typically mounted on the roof or other exterior surface of automotive vehicles and have proved to be very useful and popular accessory items for carrying a load.

Early forms of luggage racks employed side rails with intermediate skid strips.

Another general type of luggage rack has slats along the sides of the vehicle on which stanchions connected to cross members are mounted.

In more recent designs, the cross members have stanchions which are slidably engaged with the side rails so that the cross members may be moved along the side rails to conform to the size of the load and then locked in position. Examples of this type of design are shown in U.S. Pat. Nos. 5,007,570 and 5,170,920.

The luggage rack of the present invention is of the latter type in which the stanchions on the cross members slidably engage a pair of side rails mounted on the roof or other exterior surface of the vehicle.

Each side rail has an elongated channel and each channel preferably has parallel top and bottom flanges defining opposite sides of the channel. The cross member has stanchions on the ends of a cross bar. The stanchions each have a body portion and each body portion preferably has an elongated slot extending parallel to the flanges, with the slots slidably receiving in the top flanges of the respective side rails and with a portion of the body portions engaged in the channels. Means are provided for releasably locking the stanchions in adjusted positions along the rails, such means comprising a line of apertures formed in the top flanges. A lock member preferably located in a recess in the body portion of each stanchion has a locking pin engageable with any one of the apertures in the top flange of the associated side rail to lock the cross bar in adjusted position. Each lock member is shiftable from a first position in which the locking pin is engaged in one of the apertures to a second position in which the locking pin is withdrawn. Each lock member can be shifted to the position withdrawing the locking pin by pressure exerted against a button which is accessible through an opening in the stanchion. A spring is provided for each lock member to urge the locking pin into engagement with one of the apertures. Preferably, these lock members have an integral hinge, sometimes referred to as a living hinge, so that they may be shifted from one position to the other by pivoting about the axis of the hinge.

Preferably, the exterior surface of the automotive vehicle on which the luggage rack is mounted comprises a roof structure which has a central roof panel and laterally spaced apart, parallel, raised portions along the opposite side edges of the roof panel. These raised portions cooperate with the side edge portions of the roof panel in forming generally L-shaped mounting troughs for the rails. The rails are anchored firmly in the troughs and are prevented from bending or becoming distorted under a load carried by the rack. Also, these raised portions at least partially obscure the luggage rack when the vehicle is viewed from the side.

One object of this invention is to provide a luggage rack having the foregoing features.

Another object is to provide a luggage rack which is of simplified design, is composed of a relatively few simple parts, is rugged and durable in use, and is easy and inexpensive to manufacture and assemble.

These and other objects, features and advantages of the invention will become more apparent as the following description proceeds, especially when considered with the accompanying drawings.

BRIEF DESCRIPTION OF THE DRAWINGS

FIG. 2 is a view taken on the line 2—2 in FIG. 1.

FIG. 3 is a fragmentary view taken on the line 3—3 in FIG. 2.

FIG. 4 is a fragmentary sectional view taken on the line 4—4 in FIG. 3.

FIG. 5 is a fragmentary sectional view taken on the line 5—5 in FIG. 3.

DETAILED DESCRIPTION OF THE PREFERRED EMBODIMENT

Figure 1:
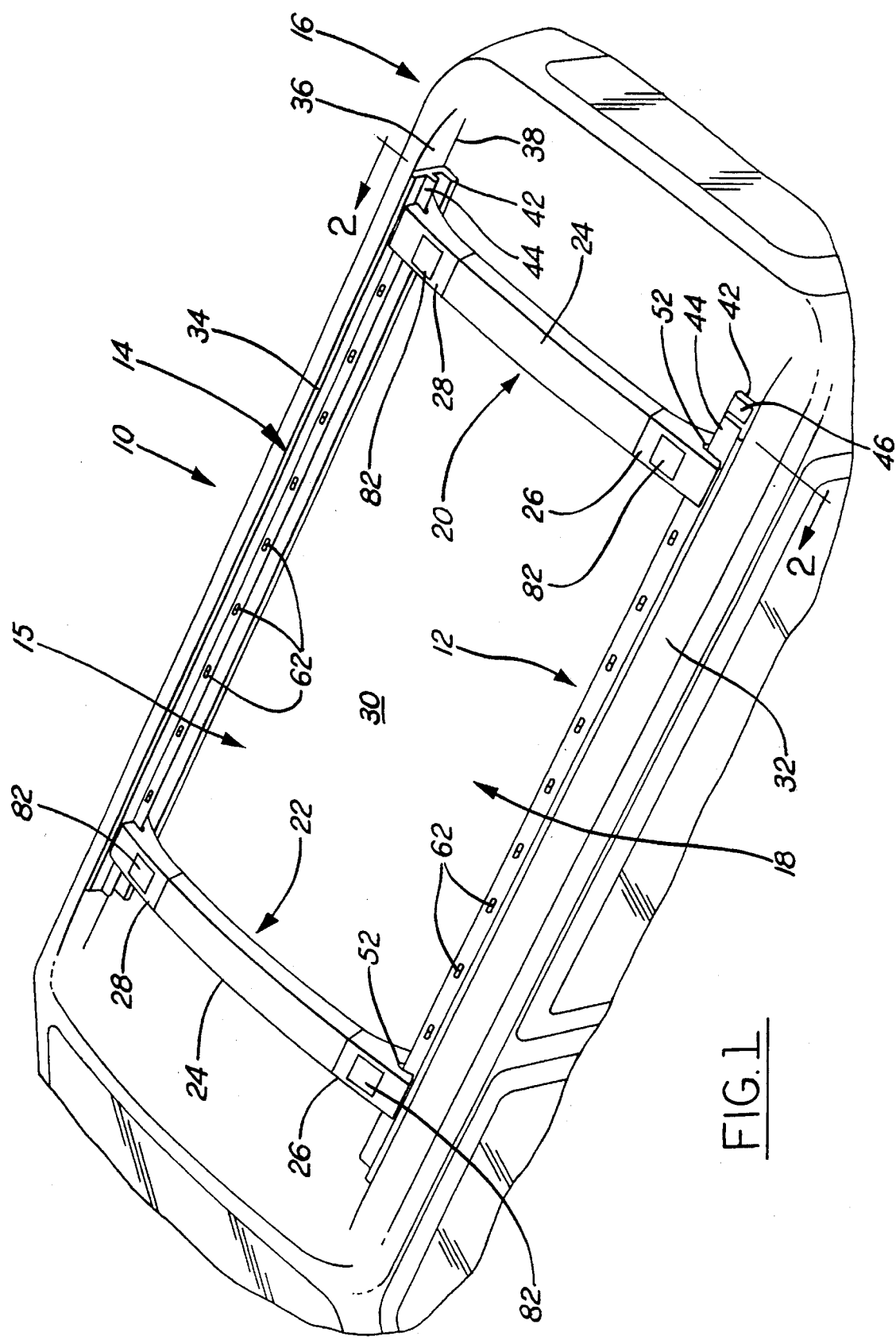
FIG. 1 is a fragmentary top view in perspective showing a luggage rack constructed in accordance with this invention mounted on the roof of a vehicle.

Referring now more particularly to the drawings, there is shown a luggage rack 10 including a pair of elongated side rails 12 and 14 mounted on an exterior body surface 15 of the automotive vehicle 16. The exterior body surface in this instance is on the top of the vehicle and comprises the roof structure 18. The rails 12 and 14 extend lengthwise of the vehicle in laterally spaced apart, parallel relation. Cross members 20 and 22 extend crosswise of the vehicle from one rail to the other perpendicular to the rails. Each cross member comprises an elongated cross bar 24 provided on one end with a stanchion 26 engageable with the rail 12 and on the opposite end with a stanchion 28 slidably engageable with the rail 14.

The roof structure 18 of the vehicle comprises a main central roof panel 30 extending over substantially the entire roof area between the raised side portions 32 and 34. The roof panel 30 may be substantially flat or somewhat upwardly arched or crowned, if desired. The raised side portions 32,34 are parallel to one another and extend lengthwise of the vehicle along the opposite side edges of the roof panel 30. The raised side portions 32,34 form walls 36 along the opposite side edges of the main panel 30 which extend upwardly and laterally outwardly as clearly illustrated in FIG. 2. The walls 36 cooperate with the opposite side edge portions of the main panel to define generally L-shaped troughs 38 in which the rails 12,14 are received and secured by suitable fasteners (not shown). The rails are thus firmly anchored in the troughs so that they will not distort or bend due to the weight of a load carried by the luggage rack.

The side rails 12,14 are mirror images of one another and each has a base 40 which is disposed in substantially full surface-to-surface contacting relation with the wall 36 of one of the raised portions 32,34. Each rail also has a bottom flange 42 and a top flange 44 which extend lengthwise of the rail. The flanges 42 and 44 of each rail are spaced apart and cooperate with the base 40 in defining an elongated channel 46 that extends for the full length of the rail. The channels 46 are open at the opposite ends for a purpose which will become more apparent as this description proceeds. The bottom flange 42 of each rail is disposed in substantially full surface-to-surface engagement with one of the side edge portions of the roof panel 30.

Each stanchion 26,28 of each cross member 20,22 has a body portion 50. Each body portion 50 has an elongated slot 52. Slots 52 extend parallel to the top flanges 44 of the side rails 12,14. The slots 52 slidably receive the top flanges 44 of the side rails.

Each body portion 50 of each stanchion 26,28 has a lower part 54 and such lower part slidably engages in the channel 46 of the associated side rail. The body portion 50 of each stanchion 26,28 also has an upper part 58. The upper parts 58 are disposed above and in sliding engagement with the top flanges 44 of the side rails.

A locking mechanism 60 is provided for each stanchion 26,28 to lock the cross members 20,22 in adjusted position longitudinally of the side rails. The locking mechanism 60 comprises a line of apertures 62 formed in each of the top flanges 44. The apertures 62 are preferably equally spaced apart from one another along the length of the respective top flanges 44 and are preferably elongated in the lengthwise direction of the top flanges although they may be of any desired shape.

The body portion 50 of each stanchion 26,28 has a recess in the form of a tunnel 70 which at one end has an opening 72 through the top wall 74 of the body portion. Each tunnel 70 extends laterally outwardly from the opening 72 to the laterally outer extremity of the body portion. There is a locking area 76 in each tunnel 70 which is beneath the slot 52 and actually is open to the slot on the underside thereof so in effect the tunnel intersects the slot.

There is a lock member 80 in the tunnel 70 of the body portion 50 of each stanchion 26,28. The lock member 80 is a somewhat elongated plate-like member and has a laterally inner end portion which forms a release button 82 that is in registry with the opening 72 in the body portion and also has a laterally outer end portion 84 which extends into the locking area 76 of the tunnel. A locking pin 86 formed integrally with the laterally outer end portion 84 of the lock member 80 is engageable with any one of the apertures 62 in the top flange 44 of the associated side rail. Locking pins 86 are preferably of substantially the same size and shape as the apertures 62, or slightly smaller, to fit snugly therein.

Each lock member 80 has a mounting portion 88 which is preferably formed integrally therewith so that the entire lock member 80 including the mounting portion 88 is formed from a single piece of material with the mounting portion 88 connected to the button 82 along a bend line 90 constituting a living hinge. The mounting portion 88 is secured to the body portion of each stanchion within tunnel 70 by fasteners 89. The bend line 90 constitutes a hinge point which allows the lock member 80 to pivot upwardly to the locking position of FIG. 6 in which the pin 86 is engaged in one of the apertures 62 and downwardly to the position of FIG. 7 in which the pin is withdrawn.

Figure 6:
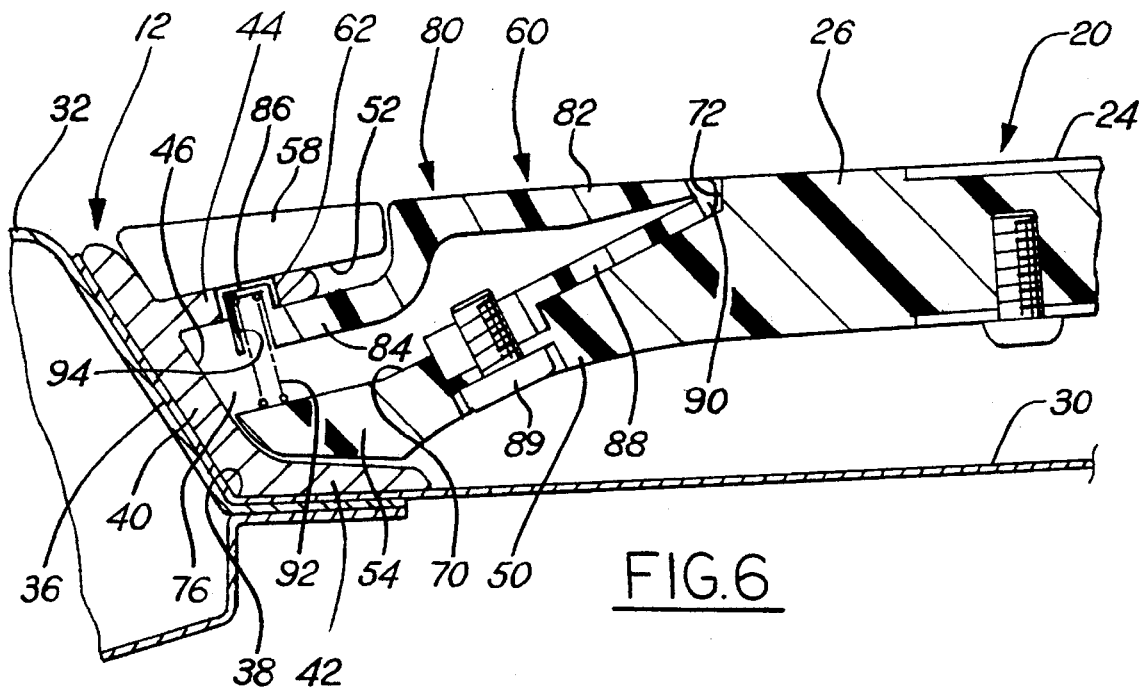
FIG. 6 is an enlarged sectional view taken on the line 6—6 in FIG. 3.
Figure 7:
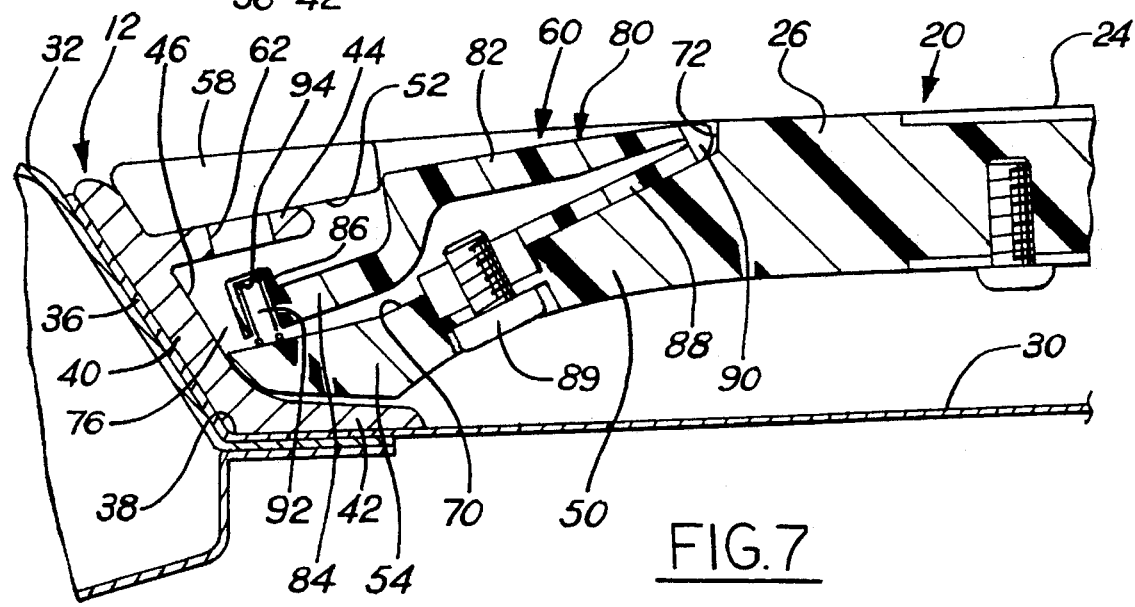
FIG. 7 is a view similar to FIG. 6, but shows the locking pin withdrawn.

Each lock member 80 is urged upwardly to the FIG. 6 position by a compression coil spring 92. The pin 86 has a socket 94 which is open at the bottom. The compression coil spring 92 has its lower end bearing against the bottom of the tunnel 70 near the outer extremity thereof and has its upper end extended into the socket 94 of the pin 86.

The release button 82 of the lock member extends into the opening 72 of the inner end of the tunnel 70 so that it is substantially flush with the top surface 74 of the body portion of the stanchion. The release button 82 may be manually depressed to withdraw pin 86 from one of the apertures 62. When the locking pins 86 are withdrawn from the apertures 62, the cross members 20 and 22 may be moved lengthwise of the side rails 12 and 14 and locked in another position. Normally the pins are held engaged in apertures 62 by springs 92. The channels 46 are open at both ends. Accordingly, the cross members may be assembled with or completely removed from the side rails at either end.

The lock members 80 may be formed of any suitable relatively stiff, flexible bendable material and are preferably formed of a nylon-based plastic.

What is claimed is:

1. A luggage rack for an automotive vehicle having an exterior body surface, comprising a pair of elongated rails adapted to be mounted on said exterior body surface in laterally spaced apart, parallel relation, each of said rails having an elongated channel extending lengthwise thereof, said channels opening toward one another and each channel having top and bottom flanges defining opposite sides thereof, at least one cross member comprising an elongated cross bar extending between said rails transversely thereof and having opposite ends, a stanchion on each end of said cross bar, said stanchions each having a body portion and each body portion having an elongated slot extending parallel to said flanges, said slots slidably receiving the top flanges of said respective side rails, said body portions of said stanchions each having a lower part and said lower parts being slidably engaged in the channels of said respective side rails, said body portions of said stanchions each having an upper part and said upper parts being disposed above and in sliding engagement with the top flange of said respective side rails, and means for releasably locking said stanchions in adjusted position longitudinally of said rails, said locking means comprising a line of apertures formed in each of said top flanges in spaced apart relation along the length thereof, the body portion of each stanchion having a top wall laterally inwardly of said top part thereof and an opening in said top wall, a recess in said body portion of each said stanchion extending from said opening laterally outwardly to a locking area beneath and in communication with said slot therein, and an elongated lock member in the recess of the body portion of each said stanchion, each of said lock members having an inner end portion formed with an integral release button in register with the opening in said top wall of the body portion of the associated stanchion which is substantially flush with said top wall and is uncovered and exposed so that external pressure may be applied thereagainst, each of said lock members having a terminal outer end portion extending into said locking area, each of said lock members having a mounting portion rigidly secured in the recess of the body portion of the associated stanchion, each of said lock members, including said inner and outer end portions and said mounting portion thereof, being formed integrally from a single piece of material with said mounting portion connected to said inner end portion by a flexible bend line constituting a living hinge, the second end portion of each of said lock members having a locking pin engageable in any one of the apertures in the top flange of the associated side rail, each of said lock members being swingable about said hinge from a first position in which the locking pin thereof is extended into one of said apertures to a second position in which said locking pin is withdrawn therefrom, said locking members normally assuming said first position but being swingable to said second position by pressure exerted against said release button, and spring means urging each of said lock members to said first position thereof.

2. A luggage rack for an automotive vehicle having an exterior body surface, comprising a pair of elongated rails adapted to be mounted on said exterior body surface in laterally spaced apart, parallel relation, each of said rails having an elongated channel extending lengthwise thereof, said channels opening toward one another and each channel having top and bottom flanges defining opposite sides thereof, at least one cross member comprising an elongated cross bar extending between said rails transversely thereof and having opposite ends, a stanchion on each end of said cross bar, said stanchions each having a body portion and each body portion having an elongated slot extending parallel to said flanges, said slots slidably receiving the top flanges of said respective side rails, said body portions of said stanchions each having a lower part and said lower parts being slidably engaged in the channels of said respective side rails, said body portions of said stanchions each having an upper part and said upper parts being disposed above and in sliding engagement with the top flanges of said respective side rails, and means for releasably locking said stanchions in adjusted position longitudinally of said rails, said locking means comprising a line of apertures formed in each of said top flanges in spaced apart relation along the length thereof, the body portion of each stanchion having a top wall laterally inwardly of said top part thereof and an opening in said top wall, a recess in said body portion of each said stanchion extending from said opening laterally outwardly to a locking area beneath and in communication with said slot therein, and a lock member in the recess of the body portion of each said stanchion having a first end portion forming a release button in register with the opening in said top wall and a second end portion extending into said locking area, the second and portion of each lock member having a locking pin engageable with any one of the apertures in the top flange of the associated side rail, each of said locking members being shiftable from a first position in which said locking pin thereof is extended into one of said apertures to a second position in which said locking pin is withdrawn therefrom, said lock members normally assuming said first position but being shiftable to said second position by pressure exerted against said release button, a mounting for each of said lock members, means fastening said mountings in the recesses of said respective body portions, a hinge connecting said release buttons to said respective mountings to enable swinging of said lock members between said first and second positions, each of said lock members and their respective mountings being formed integrally from a single piece of material and connected at a flexible bend line constituting said hinge, spring means urging each of said lock members to said first position, said spring means including a spring in each recess bearing against the locking pin therein, each of said pins having a socket and said springs being compression coil springs extending into the sockets of said respective pins.

3. A luggage rack as defined in claim 2, wherein each of said recesses is a tunnel extending from said opening in the top wall of the body portion of the associated stanchion through the laterally outer extremity thereof.

4. A luggage rack as defined in claim 3 in combination with the exterior surface referred to in claim 1, wherein said exterior surface comprises an automotive vehicle roof structure including a central roof panel having side edge portions extending lengthwise of the vehicle and also including laterally spaced apart, parallel raised portions extending along said respective side edge portions lengthwise of the vehicle, said raised portions providing generally upwardly extending walls along said side edge portions which cooperate with the latter in forming generally L-shaped mounting troughs for said rails, and means for securing said rails in said respective troughs, said raised portions at least partially obscuring said luggage rack when the vehicle is viewed from the side.

5. A luggage rack in combination with an exterior body surface of an automotive vehicle wherein said external body surface comprises roof structure of the vehicle including a central roof panel having side edge portions extending lengthwise of the vehicle and also including laterally spaced apart, parallel raised portions extending along said respective side edge portions lengthwise of the vehicle, and wherein said raised portions provide generally upwardly extending walls along said side edge portions which cooperate with the latter in forming parallel, generally L-shaped mounting troughs, said luggage rack comprising a pair of elongated rails mounted on said central roof panel in said troughs in laterally spaced apart, parallel relation, means securing said rails in said respective troughs, each of said rails having an elongated channel extending lengthwise thereof, said channels opening toward one another and each channel having top and bottom flanges defining opposite sides thereof, at least one cross member comprising an elongated cross bar extending between said rails transversely thereof and having opposite ends, a stanchion on each end of said cross bar, said stanchions each having a body portion and each body portion having an elongated slot extending parallel to said flanges, said slots slidably receiving the top flanges of said respective side rails, said body portions of said stanchions each having a lower part and said lower parts being slidably engaged in the channels of said respective side rails, said body portions of said stanchions each having an upper part and said upper parts being disposed above and in sliding engagement with the top flanges of said respective side rails, and means for releasably locking said stanchions in adjusted position longitudinally of said rails, said locking means comprising a line of apertures formed in each of said top flanges in spaced apart relation along length thereof, the body portion of each said stanchion having a top wall laterally inwardly of said top part thereof and an opening in said top wall, a recess in said body portion of each said stanchion extending from said opening laterally outwardly to a locking area beneath and in communication with said slot therein, and a lock member in the recess of the body portion of each said stanchion having a first end portion forming a release button in register with the opening in said top wall and a second end portion extending into said locking area, the second end portion of each lock member having a locking pin engageable with any one of the apertures in the top flange of the associated side rail, each of said locking members being shiftable from a first position in which said locking pin thereof is extended into one of said apertures to a second position in which said locking pin is withdrawn therefrom, said lock members normally assuming said first position but being shiftable to said second position by pressure exerted against said release button.

6. A combination as defined in claim 5, wherein said raised portions at least partially obscure said luggage rack when the vehicle is viewed from the side.

* * * * *